United States Patent

Southworth

[15] 3,680,692
[45] Aug. 1, 1972

[54] BOARD TRANSFER DEVICE
[72] Inventor: Ronald W. Southworth, Redding, Calif.
[73] Assignee: U.S. Plywood-Champion Papers Inc., New York, N.Y.
[22] Filed: Dec. 10, 1970
[21] Appl. No.: 96,684

[52] U.S. Cl.....................209/74 M, 209/82, 198/21
[51] Int. Cl................................................B07c 5/08
[58] Field of Search............209/74, 74 M, 82, 111.7; 198/21

[56] References Cited

UNITED STATES PATENTS

| 3,515,254 | 6/1970 | Gary | 198/21 |
| 3,455,444 | 7/1969 | Simmons | 209/82 |
| 1,929,204 | 10/1933 | Jeffrey et al. | 198/21 |
| 3,242,342 | 3/1966 | Gabar | 198/21 X |
| 3,218,066 | 11/1965 | Halberschmidt | 198/21 X |
| 3,096,871 | 7/1963 | Anderson | 198/21 X |
| 3,525,433 | 8/1970 | Babb | 209/82 |

Primary Examiner—Allen N. Knowles
Attorney—James M. Heilman and Heilman & Heilman

[57] ABSTRACT

A transfer device which lifts a board from a conveyor and moves it to one side for storage purposes. A sensing means is provided which controls the transfer means so that the board is engaged when it is midway over the transfering means. A photoelectric sensor measures the length of the board and a rejection means is provided for eliminating boards that are too large or too short.

12 Claims, 11 Drawing Figures

PATENTED AUG 1 1972 3,680,692
SHEET 1 OF 4
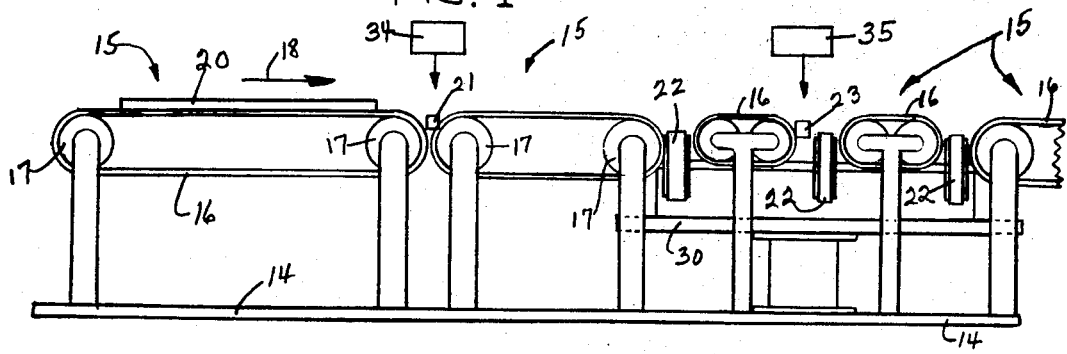
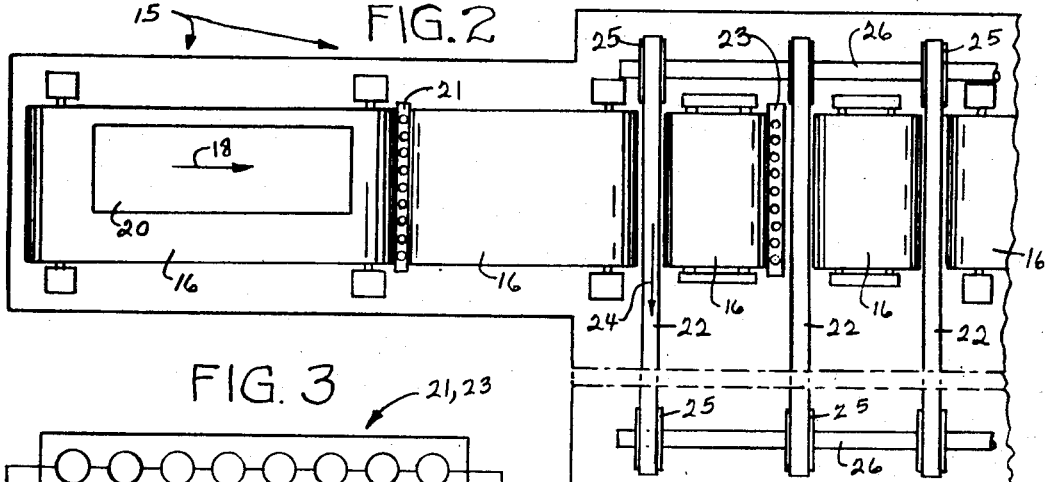
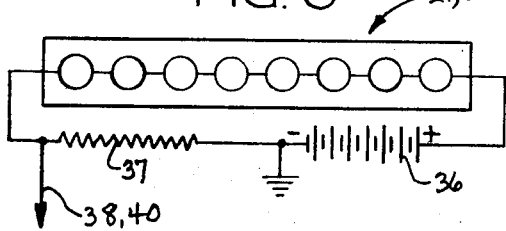
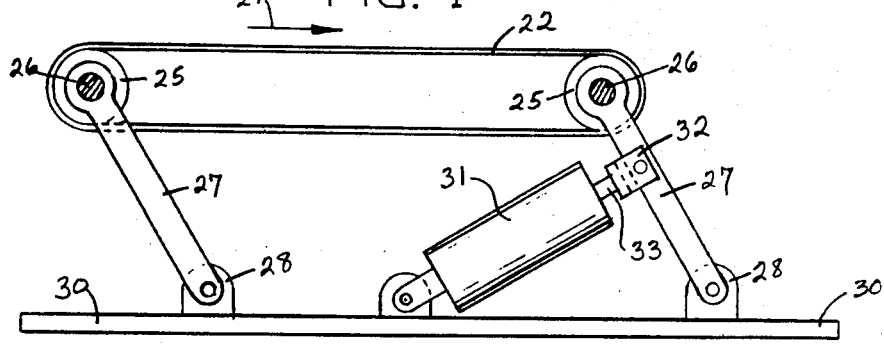
RONALD W. SOUTHWORTH
INVENTOR
BY James M. Heilman
ATTORNEY

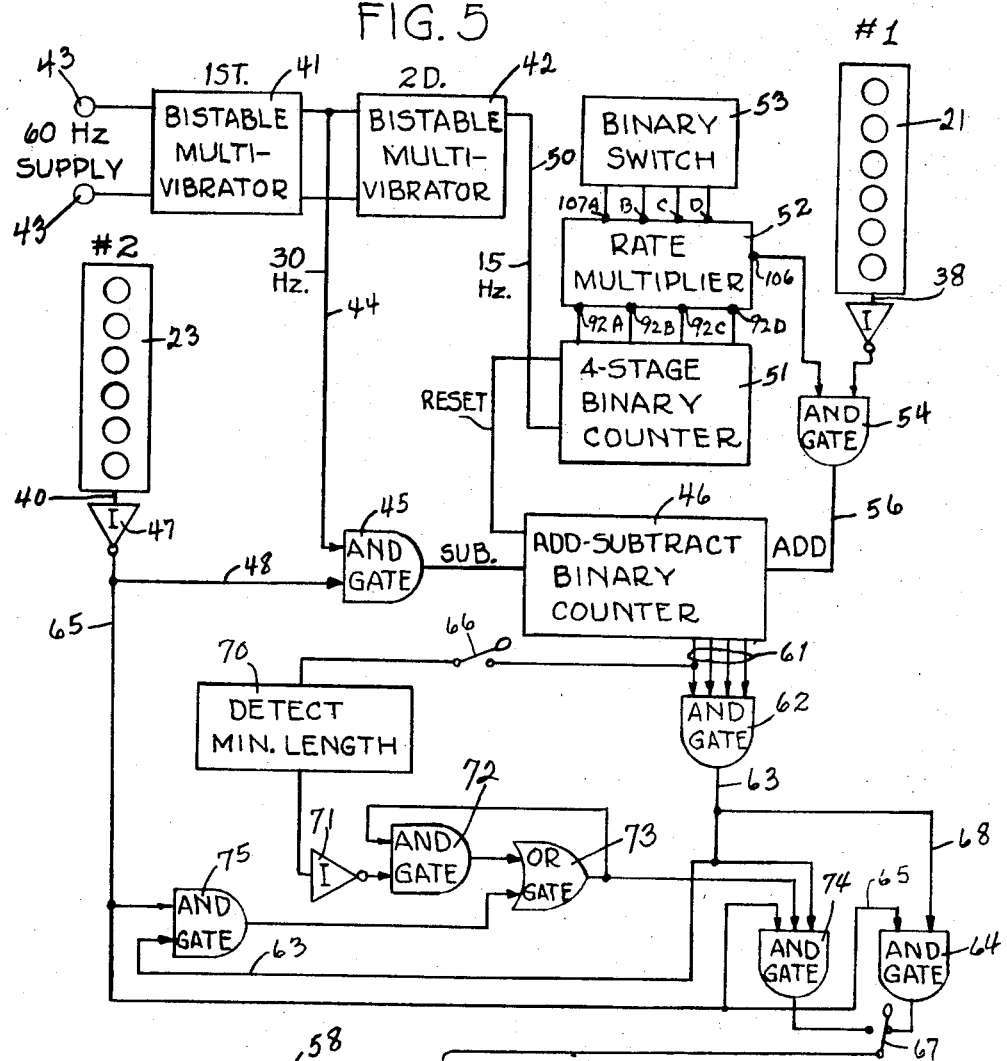
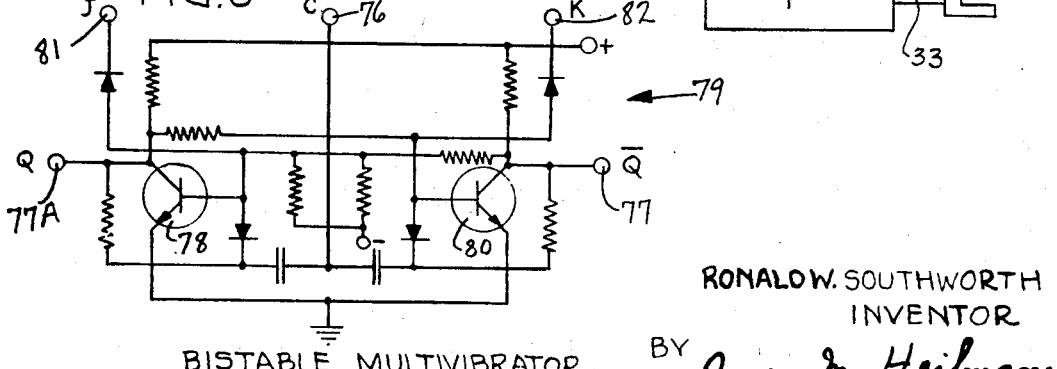

ADD-SUBTRACT BINARY COUNTER

RATE MULTIPLIER

RONALD W. SOUTHWORTH
INVENTOR

BY James M. Heilman
ATTORNEY

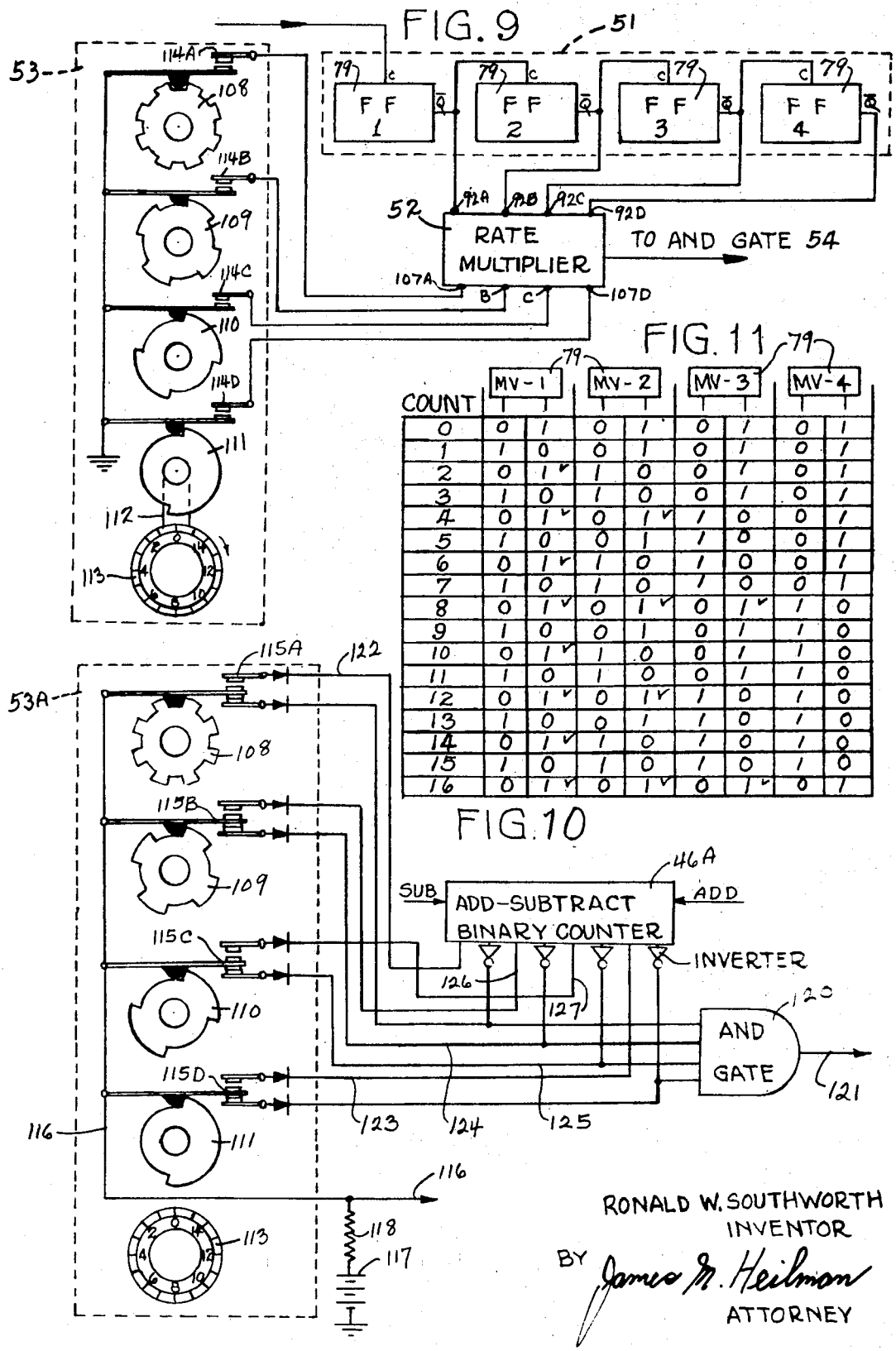

BOARD TRANSFER DEVICE

BACKGROUND OF THE INVENTION

The sorting and stacking of random lengths of lumber are major problems of the lumber industry. Sorting by the usual method of measuring by a tape or rule takes valuable time and energy. Stacking by manual means also is costly for the same reasons. Broadly this invention refers to a transfer device which lifts a board from a conveyor and moves it to one aide for storage purposes. A sensing means is provided which controls the transfer means so that the board is engaged when it is midway over the transfering means. A photoelectric sensor measures the length of the board and a rejection means is provided for eliminating boards that are too long or too short.

The present invention uses a conveyor to move the board by a series of lamps and photoconductive cells whereby the length of the board is measured without touching it. Boards of a desired length are then removed from the main conveyor by a transverse series of conveyor belts. The transverse conveyor stacks the boards in a pile adjacent to the main conveyor. Only one transverse selection means is shown and described in the drawings and specifications but it will be obvious that any number of transfer means can be employed to form as many stacks as desired.

A feature of the present invention is the counting means which determines the length of a board without touching it.

Another feature of the invention is the method and means for determining the mid-point by the transfer means and moved to one side with a small amount of electrical power.

Another feature of the invention is a calculation means which allows for the inertia and time delay of the transfer means to engage the selected board at its mid-point even though the conveyor belts are moving at high speed.

Still another feature of the invention is the method and means for counting in a positive mode at a first frequency (15 Hz.) when the board passes a first sensing station, and then counting in a negative mode at twice the first frequency (30 Hz.) when the board passes a second sensing station to determine its mid-point.

For a better understanding of the present invention, together with other details and features thereof, reference is made to the following description taken in connection with the accompanying drawings.

BRIEF DESCRIPTION OF THE FIGURES

FIG. 1 is a side view of the apparatus showing the main conveyor, the sensing means, and the transfer conveyor.

FIG. 2 is a top view of the apparatus shown in FIG. 1.

FIG. 3 is a circuit diagram of the photoconductive cell array.

FIG. 4 is a side view of the transfer conveyor system showing the air piston which moves the conveyor belts into board engaging position.

FIG. 5 is a schematic diagram of connections of the entire electrical system with all the component circuits shown in block.

FIG 6 is a schematic diagram of connections of one of the bistable multivibrators used in the system showing the detailed wiring.

FIG. 9 is a schematic wiring diagram showing how the binary counter (4 multivibrators), the rate multiplier, and the binary switch are connected.

FIG. 10 is a wiring diagram of an alternate form of the circuit using an output "AND" gate and a double throw binary switch.

DESCRIPTION OF THE PREFERRED EMBODIMENT

Figure 7:
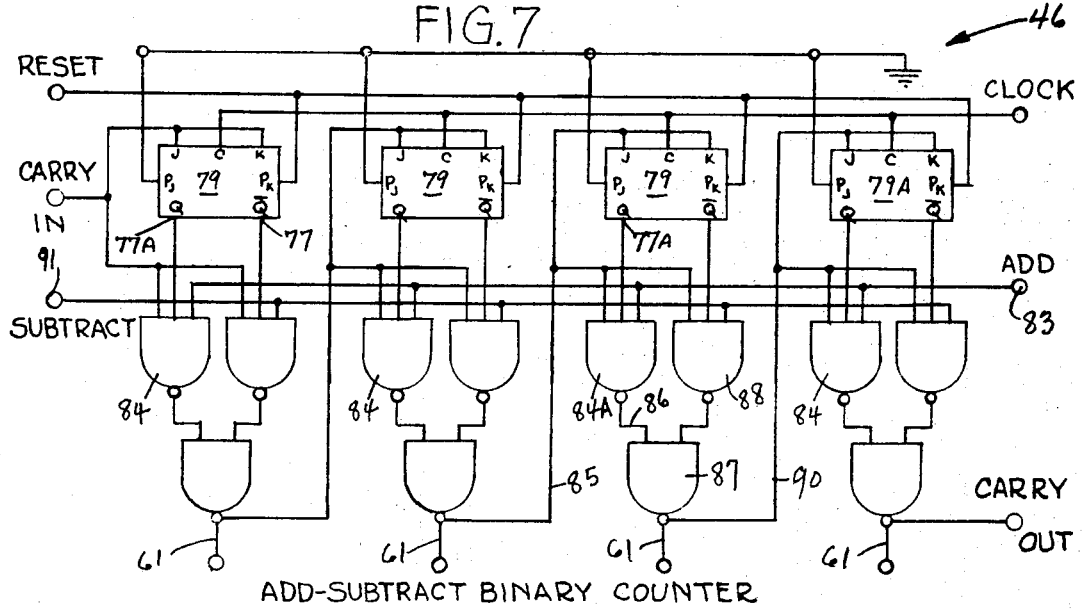
FIG. 7 is a wiring diagram of the "add-subtract" binary counter used in the system.

Referring now to FIGS. 1 through 4, the device includes a main conveyor 15, mounted on a base 14. The conveyor 15 includes a first endless conveyor belt combination 16 moving on cylinder rollers 17 which move the top portion of the belt in a direction indicated by the arrow 18. Motive power (not shown) is supplied to the cylinders to turn them at a constant speed to move an object, such as a board 20 in the direction indicated. The main conveyor 15 is in several parts and continues to provide board movement through a first sensing array position 21 where the counting operation is started. The board then moves over transverse belts 22 and a second sensing array 23. The right hand belt 16 may be a long belt similar to the first to move boards of unwanted lengths to a terminal stack (not shown) or to a second transfer device similar to the one shown. The transfer belts 22 are moved in a direction indicated by the arrow 24 by pulleys 25 secured to shafts 26 and turned by an electric motor.

As shown in FIGS. 1 and 2, belts 22 are positioned in spaces between sections of the main conveyor belt 16 so that they may be moved upwardly at the right moment to lift a board from the main conveyor and move it transversely away from the main belt to stack the board at a position removed from the main belt to stack the board at a position removed from the main apparatus. To accomplish this action, the pulleys 25 and belts 22 are mounted on rockable supports 27, pivotly secured to bearings mounted on a sub-base 30.

The supports 27 are normally in a position shown in FIG. 4, well below the plane of the top surface of the main belt 16. At least one of the supports 27 is coupled to a piston-cylinder combination 31, one end of which is coupled to the base 30 and the other end of which is coupled to a support 27 by means of a U-shaped device 32. When an operating signal is received from the electronic control system, air is forced into the cylinder 31 and a piston rod 33 is moved to the right as viewed in FIG. 4 to lift the three transfer belts up above the plane of the main belt 16, lift a board from the main belt, and move it away from the main belt to deposit it on a stack.

The board sensing means includes an array of photoconductive cells 21, 23, shown in greater detail in FIG. 3, and a source of light 34,35, each mounted directly above one of the cells and each arranged to supply a continuous source of light to the cells. As indicated in FIG. 3 all the cells in each array are connected in series with each other, the end cells connected respectively to a source of direct current potential 36 and a resistor 37. The other ends of the source 36 and resistor 37 are connected to ground. The high end of the resistor is connected to a conductor 38, 40 (see FIG. 5) and the control apparatus. Any board 20 moving along the main belt 16 will block out the light to at least one conductive cell when it passes over the cell position. This action cuts off all the current from the source 36 and reduces the potential of conductor 38 to zero. The change in potential produces a pulse which is sent to the control circuit. When the board finally clears the sensing position, all the cells are uncovered and the current through the cells and resistor 37 is again established causing an increase in potential on conductor 38.

The same action occurs at the second sensing array 23 where a negative going pulse is sent over conductor 40 to the control circuit when the board 20 cuts off the light from source 35. In each case the duration of the electric pulse is a measure of the board length.

CONTROL CIRCUIT

The control circuit is shown in FIG. 5 and includes a first bistable multivibrator 41 and a second bistable multivibrator 42. The first multivibrator is connected to terminals 43 which are supplied with the usual 60 hertz electric power. The output of this circuit is one-half the supply frequency or 30 hertz and this power is applied to the second multivibrator 42 which again divides the frequency by 2, producing alternating pulses of 15 hertz. The 30 hertz wave is applied over conductor 44 to AND gate 45. The result is a steady application of subtracting counting pulses at 30 hertz as long as one or more of the photoconductive cells is covered in the second array 23.

The second bistable multivibrator 42 receives its control frequency of 30 hertz from the first circuit 41 and divides it by 2 in the same manner. The 15 hertz signal is applied over conductor 50 to a four stage binary counter 51 coupled to a rate multiplier circuit 52 by four conductors, one for each stage. The rate multiplier is coupled to a binary switch 53 in a similar manner. The output from the rate multiplier is applied to an "AND" gate 54 which functions in the same manner as the "AND" gate 45. The first array of photoconductive cells is the same as the second, giving a zero output when any one of its series connected cells is covered. The output is transferred over conductor 38 to an inverter circuit 55 and then to the "AND" gate 54. As before, a control signal is applied over conductor 56 to count by adding in the counter 46 only when the board 20 covers a cell in array 21. The action of the rate multiplier and the binary switch will be described when the operation of the entire circuit is described.

The general action is to count up at 15 hertz when the board passes over the first array 21. The resulting count is stored in the add-subtract counter 46. Then when the board passes over the second array 23, the 30 hertz signal counts down at twice the rate so that when the counter is reduced to zero, the board is half way over the second array. At this time a signal is given to a solenoid valve 57 and compressed gas from a storage tank 58 passes through conduit 60 to operate the piston in cylinder 31, extend rod 33 and coupling 32, to elevate the transverse belts 22 (see FIGS. 1, 2, and 4) and thereby move the board from the main conveyor to an adjacent stack.

The binary counter 46 includes four bistable multivibrators (see FIG. 7) and four output conductors 61. At the start of operations the counter 46 is in its zero condition, with a negative voltage on all four output conductors. This condition activates "AND" gate 62 and sends a pulse over conductor 63 to "AND" gate 64. However, at the start of operations no board has covered any of the photoconductive units in sensor 23, there is no signal on conductor 65 and the "AND" gate is closed, sending no operating pulse to the solenoid valve 57 at this time.

If it is desired to remove all the boards from the main conveyor and stack all of them in a single location, a switch 66 is opened and a second switch 67 is thrown to the right as indicated in FIG. 5. Then the operation proceeds as described above, counting up while the first set of photocells 21 is covered, and counting down at twice the rate when the second of photocells 23 is covered. When the binary counter reaches zero and all four conductors 61 transmit a negative pulse to "AND" gate 62, a positive pulse is sent over conductors 63 and 68 to "AND" gate 64. At the same time the voltage on conductor 65 is high because the board covers some of the cells in set 23. "AND" gate 64 then passes a pulse through switch 67 to solenoid 57 and the board is removed from the main conveyor and stacked.

If it is desired to stack only boards having a length greater than a predetermined minimum, switch 66 is closed and switch 67 is thrown to the left. Switch 66 connects a timing circuit 70 (Detect Min. Length) to the lowest order output conductor of the binary counter 46. The timing circuit 70 has its output connected through an inverter amplifier 71 to an "AND" gate 72. The output of the "AND" gate 72 is applied through an "OR" gate 73 to a triple input "AND" gate 73 whose output is connected through switch 67 to the solenoid valve 57. A second input to "OR" gate 73 is connected to the output of another "AND" gate 75, having inputs connected to inverter 47 and "AND" gate 62. These additional circuits detect boards having a minimum length and transfer them to the stack by the transfer belts. Boards longer than the minimum length will be permitted to pass down the main conveyor belt to its end or to another transfer station. The operation of this circuit will be described later.

FIG. 6 is a detailed diagram of a conventional bistable multivibrator 79 with a clock input. This circuit is used in the first and second multivibrator divider circuits 41 and 42. The 60 hertz input from terminal 43 is applied to clock terminal 76 and the output from terminal 77 is connected to terminal 76 in the next order circuit 42. Four of these circuits are used in the add-substract counter 46 shown in greater detail in FIG. 7. Each multivibrator circuit includes two transistors 78 and 80, two input connections 81 and 82 when the clock input is not used and at least four diode rectifiers to restrict the transfer action to negative input pulses. Four of these circuits are also used in the circuit shown in FIG. 9.

FIG. 7 shows one form of add-substract counter 46 which can be used in the main circuit. Ring counters may also be used. Four bistable multivibrators 79 are used with their output terminals 77 and 77A connected to a series of interconnected "NAND" gates. This circuit is available commercially on a single integrated base, such as Cambion No. 780–2609. Add pulses are applied to terminal 83 from conductor 56 and sent to four "NAND" gates. If the third gate 84A also receives negative voltages from the next lower stage over conductor 85 and if the terminal 77A is low, then a pulse is applied over output conductor 86 to "NAND" gate 87. If a similar set of conditions exists at gate 88 an output pulse is sent over conductor 90 to the next multivibrator 79A to count up one. To count down, counting pulses are applied to terminal 91.

Figure 8:
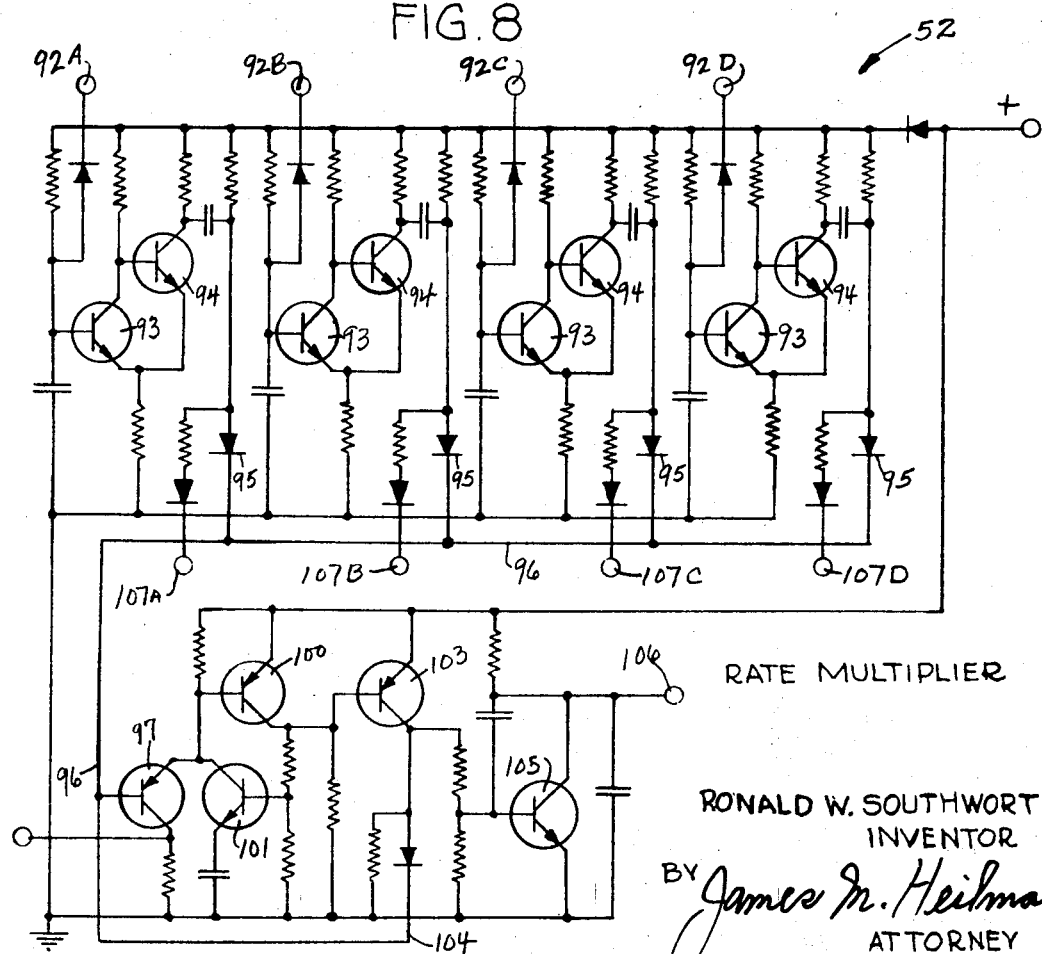
FIG. 8 is a wiring diagram of the "Rate Multiplier" circuit used between the binary counter and the binary switch.

FIG. 8 is a detailed circuit diagram of a Rate Multiplier. There are four input terminals 92, A,B,C, and D, each connected, through a diode, to the base of a transistor 93. A second transistor 94 forms a "Darlington" pair to create a high impedance input. The outputs of each pair of transistors are sent through diodes 95 to a common line 96 which is connected to the base electrode of an amplifier transistor 97. Transistor 97 is coupled to a double transistor circuit 100, 101 which sharpens both the rise time and the decay characteristic of the incident pulses. This doublet acts in a manner similar to a controlled rectified but resistor 102 is made large enough so that the current is turned off after each pulse. The output of this stage is applied to a collector follower transistor 103 which is connected to a feedback line 104 running back to the base of transistor 97. This feed-back circuit also tends to transform the pulses into a form resembling a square topped wave. The amplifier is terminated by a power transistor 105 and an output terminal 106. The rate multiplier section also is provided with output terminals 107 A,B,C, and D for each of the four stages.

Because of the inertia of the board and the transfer machinery, an accurate sensing of the board and its half length results in a time delay before the transfer belts 22 actually lift the board from the main belt 16 to move the board to one side. To adjust for this delay (which may be variable) a binary switch 53 is added to the circuit.

Two forms can be used. In the simpler circuit, a series of four cam wheels, 108 and 109, 110, and 111 are all secured to a shaft 112 and a dial 113. Each cam wheel operates a switch 114 to connect a conductor running to the rate multiplier to ground. The dial is graduated in 16 parts, each representing a count between one and 16. When the cam wheels are turned, the first wheel 108 closes contacts 114A eight times for each revolution, the second wheel 109 closes contacts 114B four times for each revolution, the third wheel 110 closes contacts 114C twice each revolution, and the fourth wheel 111 closes contacts 114D only once during a complete revolution. As can be seen from the drawing at the zero position all contacts are open, one-sixteenth rotation of the dial 113 closes only contacts 114A, a second sixteenth rotation opens contacts 114A and closes contacts 114B. This action corresponds to the binary code and to the condition chart shown in FIG. 11 where the left hand column under each multivibrator 79 indicates its condition, a zero (0) indicating a non-conducting transistor. The check mark (√) indicates a carry to the next higher denominational order. Now, let it be assumed that it is desired to start to operate the transverse belts five counts (one-third of a second) before the complete count down. At this time, count "six", the first and fourth multivibrators are conducting on their right side (see FIG. 11) and the second and third multivibrators are conducting on their left side. To stop the count down and operate the solenoid 5T, dial 113 is turned to 6, thereby opening contacts 114A and 114D and closing contacts 114B and C. When the multivibrators 79 are in their 6 position, a low, non-operating, voltage is applied to terminals 92A and 92D to eliminate output voltages on terminals 107A and 107D (FIG. 8). Terminals 107B and 107C are grounded by way of the closed contacts 114B and C in the binary switch 53 so that there is no voltage pulse transmitted over conductor 96 and terminal 106 FIG. 8) is low, sending no voltage pulse to gate 54 to stop the count six pulse times before reaching the normal zero position. This means that the count down operation will produce a zero count in counter 46 six pulses times sooner than the normal time if the binary switch were not in the circuit.

FIG. 10 shows an alternate form of circuit for using a binary switch to produce an early termination of the counting action in advance of the usual time interval. In this circuit a binary switch 53A has the same cam wheels 108, 109, 110, and 111 as the device shown in FIG. 9. The dial turn wheel 113 is also the same. The switches 115 A, B, C, and D are double throw devices, each having a normally closed and a normally open pair of contacts. The common switch plates are connected together and to conductor 116 which is connected to a source of potential 117 in series with a resistor 118. All the stationary contacts are connected to the add-substract counter 46A.

In this form of counter both the right and left output terminals are made available for connection to the switch 53A. The right output terminals are each connected to an inverter to change their polarity so that, when a multivibrator is conducting on the right hand side, the normally low voltage is transformed into a high voltage. All the right hand outputs are connected to an "AND" gate 120 whose output conductor 121 is at a high oultage at the start of the count and at the finish of the count down.

Let it be assumed that it is desired to operate the solenoid 57 six counts in advance of the normal time in order to compensate for the inertia of the mechanical components of the system. As before, the dial 113 is turned to 6 and high voltage from source 117 is applied to the upper contacts and conductors 122, 123. Contact switch plates 115B and 115C are not moved from their normal position and high voltage is thereby applied to conductors 124 and 125. As described above, in the 6 count position, (see FIG. 11) the second and third multivibrators are actuated and conductors 126 and 127 are at low voltage. The result is that, when the six count condition is reached during the count down, all conductors connected to the "AND" gate are high and a high voltage pulse is sent over conductor 121 to both "AND" gates 64 and 74. If this alternate form of circuit is used, "AND" gate 62 will be replaced, as will the binary switch 53, the rate multiplier 52, and the four stage binary counter 51. Conductor 116 is at high voltage only when current from source 117 is not being used. This conductor replaces the output lead from rate multiplier 52 to the "AND" gate 54.

The embodiment of the invention in which an exclusive property or privilege is claimed are defined as follows:

1. An article transfer device for moving articles from a conveyor to a position adjacent to the conveyor comprising:
   a. a conveyor means for moving articles in one direction;
   b. a first sensing means positioned along the conveyor to reveal the presence of the article at that position;
   c. a counting means for storing binary bits, controlled by the first sensing means to count in an additive manner at a first speed during the time the article is adjacent to the first sensing means;
   d. a second sensing means also positioned along the conveyor and spaced from the first sensing means to reveal the presence of the article at that position and to control the counting means to count in a subtractive manner at a second speed twice the first speed;
   e. a third sensing means for determining when the counter has reached its zero count condition, said means including a first "AND" gate circuit for generating a pulse only when the zero count is reached by the counting means;
   f. a second "AND" gate having one input line connected to the first "AND" gate circuit, a second input line connected to the second sensing means and an output line which produces a current only when the counter is zero and the secone sensing means produces no current; and
   g. a control means for activating the transverse transfer device when the gate circuit transmits a pulse.

2. A transfer device as claimed in claim 1 wherein said conveyor is an endless belt.

3. A transfer device as claimed in claim 1 wherein said first and second sensing means each include a source of light on one side the conveyor and a plurality of photosensitive transducers on the other side of the conveyor.

4. A transfer device as claimed in claim 1 wherein said counting means is an electric counter including a plurality of bistable multivibrators for storing the count.

5. A transfer device as claimed in claim 4 wherein the first sensing means is coupled to a first source of electrical pulses which determines the first counting speed.

6. A transfer device as claimed in claim 4 wherein the second sensing means is coupled to a second source of electrical pulses which determines the second counting speed.

7. A transfer device as claimed in claim 1 wherein a bistable multivibrator is coupled to a source of alternating current for dividing the frequency by two and for providing the counting means with said first and second speeds.

8. A transfer device as claimed in claim 1 wherein a second counter is coupled between a source of pulses having a frequency corresponding to said first speed and said first mentioned counting means, said second counter adapted to reduce the number of pulses applied to the first counting means when in its additive mode and thereby cause the first counting means to register zero in advance of the normal counting action.

9. A transfer device as claimed in claim 1 wherein a third counting means is coupled to the first counting means for obtaining a count responsive to the length of the article, said third counting means adapted to produce a signal which prevents activation of the transverse transfer device and permits the article to proceed along the conveyor when its length is less than a predetermined value.

10. A transfer device as claimed in claim 9 wherein the activation of the transverse transfer device is produced by a current pulse applied to a winding on a solenoid valve.

11. A transfer device as claimed in claim 1 wherein said transverse transfer device includes a plurality of endless belts moving at right angles to the conveyor means and normally positioned below the level of the conveyor means.

12. A transfer device as claimed in claim 11 wherein said transverse transfer device is moved to a position above the level of the conveyor means to lift the article and move it to a position to one side of the conveyor means, the motion of the transverse transfer device provided by a piston device operated by compressed gas.

* * * * *